(12) United States Patent  
Moore et al.

(10) Patent No.: US 8,899,616 B2  
(45) Date of Patent: Dec. 2, 2014

(54) AIRBAG DEPLOYMENT CONTROL SYSTEM (75) Inventors: Jerry B. Moore, Brighton, MI (US); Robert D. Blair, III, Milford, MI (US)

(73) Assignee: Johnson Controls Technology Company, Holland, MI (US)

( * ) Notice: Subject to any disclaimer, the term of this patent is extended or adjusted under 35 U.S.C. 154(b) by 390 days.

(21) Appl. No.: 13/141,890

(22) PCT Filed: Dec. 23, 2009

(86) PCT No.: PCT/US2009/069458  
§ 371 (c)(1),  
(2), (4) Date: Sep. 8, 2011

(87) PCT Pub. No.: WO2010/075538  
PCT Pub. Date: Jul. 1, 2010

(65) Prior Publication Data  
US 2011/0309604 A1 Dec. 22, 2011

Related U.S. Application Data (60) Provisional application No. 61/140,425, filed on Dec. 23, 2008.

(51) Int. Cl.  
*B60R 21/207* (2006.01)  
*B60R 21/216* (2011.01)  
*B60R 21/2334* (2011.01)  
*B60R 21/201* (2011.01)  
*B60R 21/2338* (2011.01)

(52) U.S. Cl.  
CPC ........... *B60R 21/207* (2013.01); *B60R 21/2334* (2013.01); *B60R 21/201* (2013.01); *B60R 21/216* (2013.01); *B60R 21/2338* (2013.01); *B60R 21/2076* (2013.01)  
USPC ................... 280/730.2; 280/728.3; 280/743.2

(58) Field of Classification Search  
CPC B60R 21/207; B60R 21/216; B60R 21/2334; B60R 21/2338  
USPC ....................... 280/730.2, 728.2, 743.2, 728.3  
See application file for complete search history.

(56) References Cited

U.S. PATENT DOCUMENTS 5,810,389 A * 9/1998 Yamaji et al. ............... 280/730.2  
5,967,546 A * 10/1999 Homier et al. .............. 280/730.2

(Continued)

FOREIGN PATENT DOCUMENTS

CN 101264752 9/2008  
JP 11-129856 5/1999

(Continued)

OTHER PUBLICATIONS

Form PCT/ISA/2010, International Search Report, Dated Mar. 11, 2010.

(Continued)

*Primary Examiner* — Paul N Dickson  
*Assistant Examiner* — George Spisich  
(74) *Attorney, Agent, or Firm* — Butzel Long (57) ABSTRACT

An airbag deployment control system for use in a vehicle seat having a trim cover. The airbag deployment control system includes an upper outer liner member having a first end for coupling to an airbag module and a second end for coupling to the trim cover, and a lower outer liner member having a first end for coupling to the airbag module and a second end for coupling to the trim cover. The trim cover is for covering at least a portion of the vehicle seat and the airbag module. The trim cover includes a burst seam for the airbag member to deploy through the trim cover by rupturing at the burst seam upon inflation of the airbag member. The upper outer liner member and the lower outer liner member control deployment of the inflatable airbag member at least two locations.

6 Claims, 9 Drawing Sheets

(56) References Cited

U.S. PATENT DOCUMENTS

| | | | | |
|---|---|---|---|---|
| 5,967,603 | A | * | 10/1999 | Genders et al. ........ 297/216.13 |
| 5,988,674 | A | * | 11/1999 | Kimura et al. ............ 280/730.2 |
| 6,003,938 | A | * | 12/1999 | Lachat et al. ........... 297/216.13 |
| 6,299,197 | B1 | * | 10/2001 | Mueller ..................... 280/728.3 |
| 6,382,665 | B2 | * | 5/2002 | Holdampf et al. ......... 280/730.2 |
| 7,445,234 | B2 | * | 11/2008 | Hofmann .................. 280/730.2 |
| 7,458,603 | B2 | * | 12/2008 | Buono et al. .............. 280/728.2 |
| 7,562,902 | B2 | * | 7/2009 | Osterhout ................. 280/730.2 |
| 7,677,596 | B2 | * | 3/2010 | Castro et al. .............. 280/730.2 |
| 7,681,910 | B2 | * | 3/2010 | Wieczorek et al. ........ 280/730.2 |
| 8,220,832 | B2 | * | 7/2012 | Muller ...................... 280/730.2 |
| 2006/0113752 | A1 | | 6/2006 | Tracht |
| 2008/0054604 | A1 | * | 3/2008 | Castro et al. .............. 280/730.2 |
| 2008/0061539 | A1 | * | 3/2008 | Paruszkiewicz et al. .. 280/730.2 |
| 2008/0224454 | A1 | | 9/2008 | Tracht |
| 2009/0051148 | A1 | * | 2/2009 | Osterhout ................. 280/728.3 |
| 2010/0133794 | A1 | * | 6/2010 | Tracht et al. .............. 280/730.2 |

FOREIGN PATENT DOCUMENTS

| | | | |
|---|---|---|---|
| JP | 2002-002344 | | 1/2002 |
| JP | 2002-67857 | | 3/2002 |
| JP | 2011-093479 | * | 5/2011 |
| JP | 2011-121511 | * | 6/2011 |
| JP | 2011-230687 | * | 11/2011 |
| WO | WO 2008070711 | | 12/2008 |

OTHER PUBLICATIONS

First Office Action, issued Jan. 30, 2013 Re: subject application.
English translation of First Office Action, issued Jan. 30, 2013.
Patent Abstract of Japan Publication No. 11-129856, date of publication of application: May 18, 1999.
Patent Abstract of Japan Publication No. 2002-067857, date of publication of application: Mar. 8, 2002.
Patent Abstract of JP 2002-002344, date of publication of application Jan. 9, 2002.
English translation of "Final Notice of Reasons for Rejection," dated Nov. 26, 2013.

* cited by examiner

Sec A-A

FIG.10

AIRBAG DEPLOYMENT CONTROL SYSTEM

CROSS-REFERENCE TO RELATED APPLICATIONS

This application claims the benefit of and priority to US. Provisional Patent Application No. 61/140,425, filed Dec. 23, 2008, titled: AIRBAG DEPLOYMENT CONTROL SYSTEM, in the name of Moore et al. which is incorporated by reference herein.

BACKGROUND

The present disclosure relates generally to the field of vehicle seating. More specifically, this disclosure relates to a vehicle seat having an inflatable airbag contained therein and a dual cavity liner system for directing the force of the inflatable airbag in a direction towards a particular seam in the trim cover and thereby directing deployment of the inflatable airbag through the particular seam.

Side impact protection systems for vehicle passengers are generally known. One known system includes an inflatable airbag mounted to the seat back frame of a passenger seat. Seat mounted side impact inflatable airbags (SIAB) generally fall into two categories. The first type of seat mounted SIAB deploys from a visible, discrete door on the outboard side of the seat back or seat cushion bolster. The other type of seat mounted SLAB is stowed beneath the seat trim and is designed to deploy through the trim cover.

There remains a significant and continuing need to provide an improved airbag deployment control system that enhances airbag deployment performance.

SUMMARY

An airbag deployment control system for use in a vehicle seat having a trim cover is provided. The airbag deployment control system includes an upper outer liner member having a first end for coupling to an airbag module and a second end for coupling to the trim cover, and a lower outer liner member having a first end for coupling to the airbag module and a second end for coupling to the trim cover. The trim cover is for covering at least a portion of the vehicle seat and the airbag module. The trim cover includes a burst seam for the airbag member to deploy through the trim cover by rupturing at the burst seam upon inflation of the airbag member. The upper outer liner member and the lower outer liner member control deployment of the inflatable airbag member at least two locations and direct the deployment of the inflatable airbag member towards the burst seam.

A seat assembly having a trim cover and an airbag deployment control system for use in a vehicle is also provided. The seat assembly includes a seat flame member having a side member; an upper outer liner member having a first end for coupling to an airbag module and a second end for coupling to the trim cover, and a lower outer liner member having a first end for coupling to the airbag module and a second end for coupling to the trim cover. The trim cover is for covering at least a portion of the vehicle seat and the airbag module. The trim cover includes a burst seam for the airbag member to deploy through the trim cover by rupturing at the burst seam upon inflation of the airbag member. The airbag module is coupled to the side member. The upper outer liner member and the lower outer liner member control deployment of the inflatable airbag member at least two locations and direct the deployment of the inflatable airbag member towards the burst seam.

DETAILED DESCRIPTION

Figure 1:
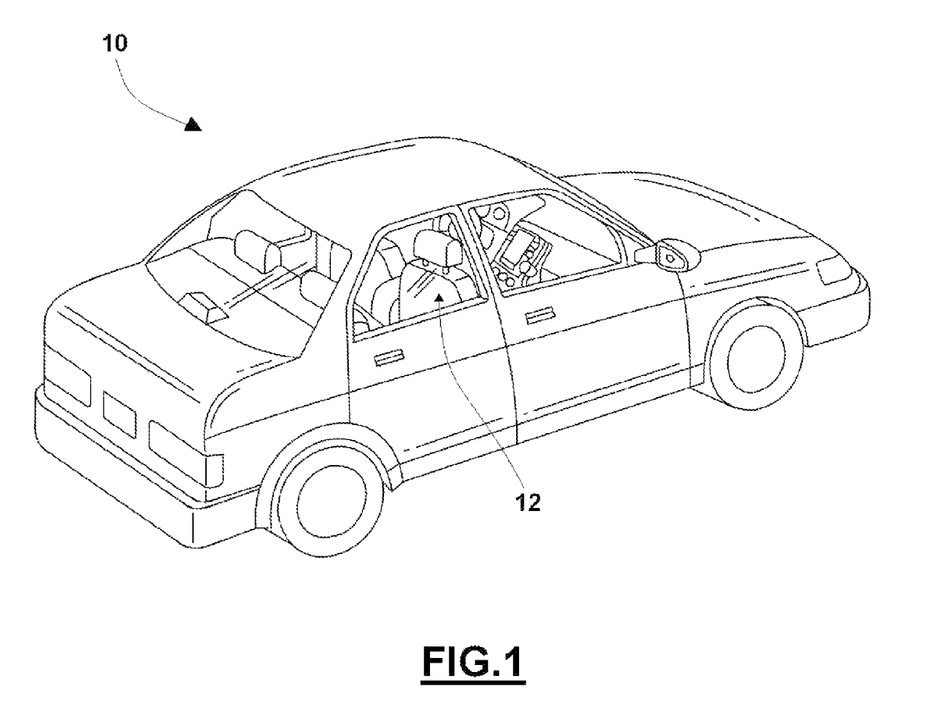
FIG. 1 is a perspective view of a vehicle having a seat assembly according to an exemplary embodiment.

Referring generally to the figures and in particular to FIG. 1, a vehicle 10 is shown according an exemplary embodiment. The vehicle 10 includes one or more vehicle seats 12 provided, for occupants of the vehicle 10. While the vehicle 10 shown is a 4-door sedan, it should be understood that the vehicle seat 12 may be used in a mini-van, sport utility, cross-over or any other type of vehicle or any other means in or by which someone travels or something is carried or conveyed for any market or application including everything from office seating and transportation to planes and space travel and everything in between. The vehicle seat 12 shown includes a seat back 14 and a seat cushion 16.

Figure 2:
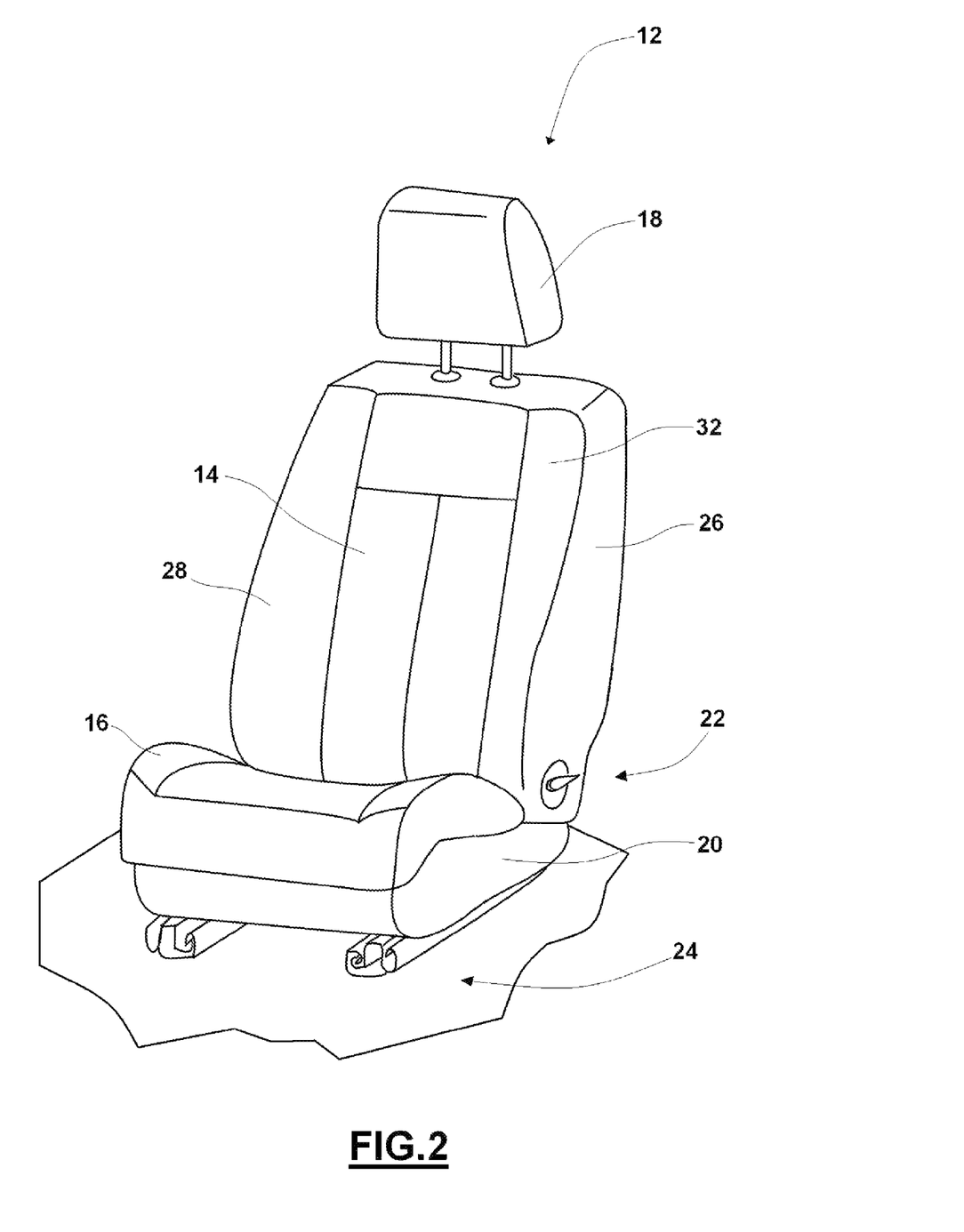
FIG. 2 is a perspective view of a seat assembly according to an exemplary embodiment.

One exemplary embodiment of an upholstered seat structure (e.g., third row seat, etc.) 12 is shown in FIG. 2. The vehicle seat 12 can, and typically does, include a head restraint 18 and a seat base portion 20 for supporting the seat cushion 16. Generally, the head restraint 18 extends upward from the seat back 14 and is configured to restrain the head of an occupant during an impact. The seat back 14 can be pivotably coupled to the seat base 20 and the seat assembly 12 can also include a recliner mechanism 22 for selectively adjusting the seat back 14 relative to the seat base 20. The seat cushion 16 and/or base portion 20 may be configured to allow the seat 12 to be selectively adjusted and positioned (manually or motor driven) relative to the vehicle interior (e.g., via a track assembly 24, etc.). The seat back can also include a first (inboard) and second (outboard) side bolster 26, 28. The seat assembly 12 can also include a plurality of cushions 30 (e.g., foam, padding, etc.) and a scat/trim cover 32 (e.g., upholstery, leather, fabric, etc.).

Figure 3:
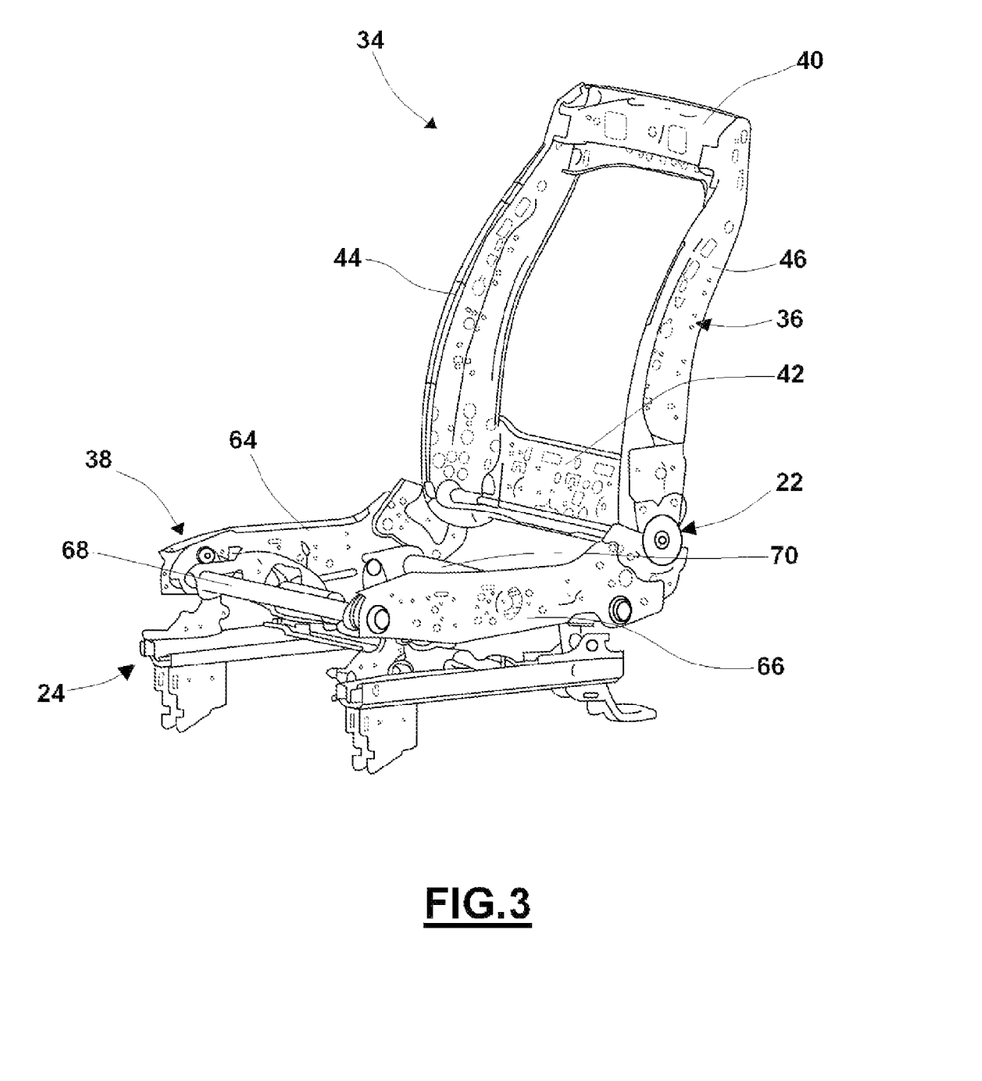
FIG. 3 is a perspective view of a seat frame assembly, according to an exemplary embodiment.

Referring now to FIG. 3, a seat frame assembly 34 is shown. The seat frame assembly 34 includes, among other things, a seat back frame 36, and a seat base frame 38. The seat back frame 36 comprises an upper cross member 40, a lower cross member 42, a first (inboard) seat back side member 44, and a second (outboard) seat back side member 46. The upper cross member 40 includes a first and a second end 48, 50, the lower cross member 42 includes a first and second end 52, 54, the first (inboard) seat back side member 44 includes a first (upper/top) end 56 and a second (lower/bottom) end 58, and the second (outboard) seat back side member 46 includes a first (upper/top) end 60 and a second (lower/bottom) end 62. The first (upper/top) ends of the first and second seat back side members 56, 60 are coupled together by the upper cross member 40 and the second (lower/bottom) ends of the first and second seat back side members 58, 62 are coupled together by the lower cross member 42 such that a substantially rectangular frame structure 36 is formed. The seat base frame 38 comprises a first (inboard) seat base side member 64, a second (outboard) seat base side member 66, a front cross (tube) member 68, and a rear cross (tube) member 70. The first (inboard) seat base side member 64 includes a first (front) and a second (rear) end 72, 74, the second (outboard) seat base side member 66 includes a first (front) end and a second (rear) end 76, 78, the front cross (tube) member 68 includes a first (inboard) end 80 and a second (outboard) end 82, and the rear cross (tube) member 70 includes a first (inboard) end 84 and a second (outboard) end 86. The front ends of the first and second seat base side member 72, 76 are coupled together by the front cross tube member 68 and the rear ends of the first and second seat base side member 74, 78 are coupled together by the rear cross tube member 70 such that a substantially rectangular frame structure 38 is formed.

Figure 4:
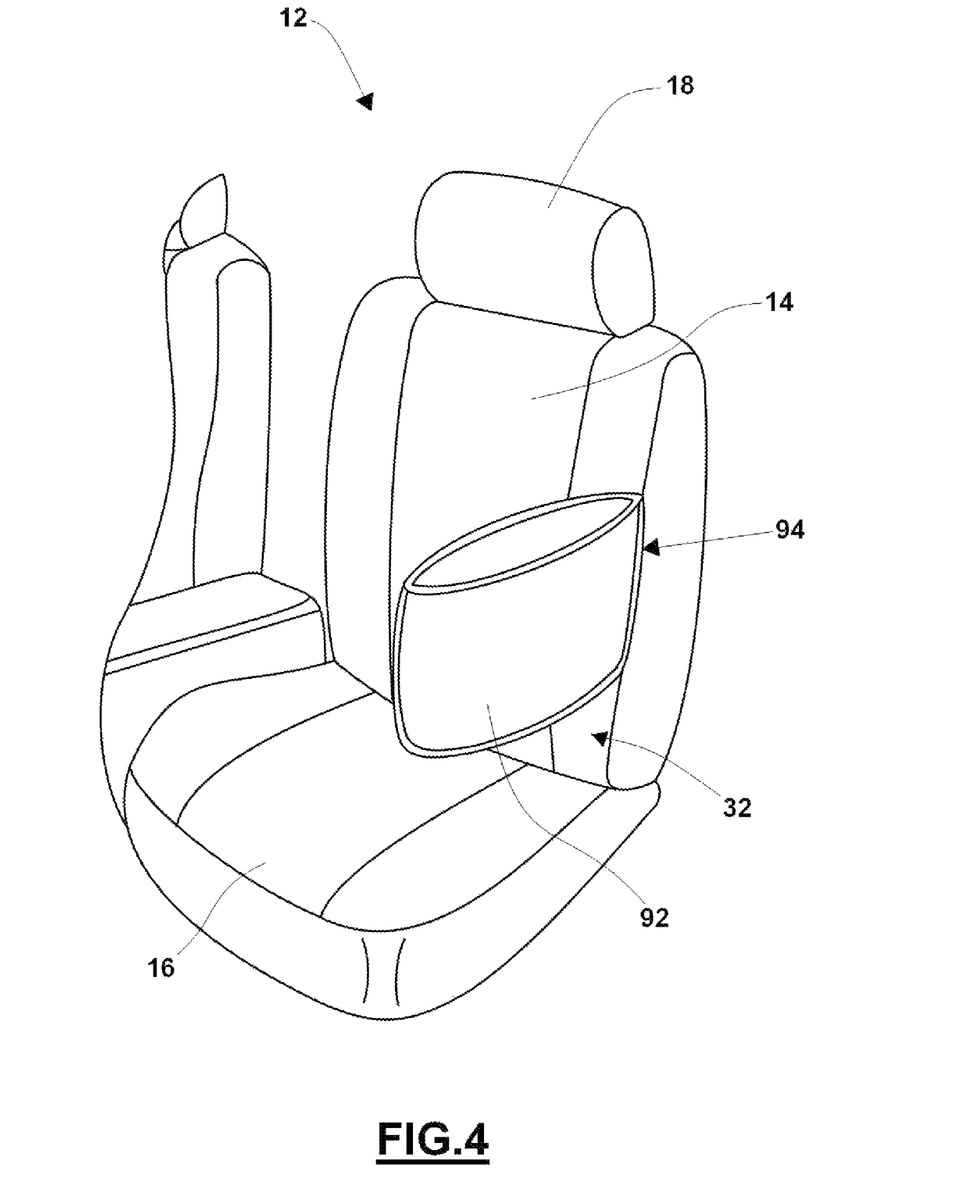
FIG. 4 is a perspective view of a seat assembly including an airbag module in a deployed configuration according to an exemplary embodiment.

Referring now in particular to FIG. 4, a seat assembly 12 including an airbag module 88 in a deployed, configuration is shown. According to an exemplary embodiment, the side impact airbag module 88 may be coupled to the vehicle seat assembly 12 (e.g., seat back, seat back frame, seat base, etc.). The side impact airbag module 88 and deployment device 90 are configured to protect an occupant of the vehicle seat assembly 12 in an accident and/or collision (e.g., side impact). According to one exemplary embodiment, the side impact airbag module 88 and deployment device 32 can be located on the outboard and/or inboard side bolster 26, 28 of the vehicle seat assembly 12 such that the airbag member 92 can be deployed through the side bolster 26, 28 such as through a burst seam 94. According to another exemplary embodiment, the airbag module 88 may be coupled to the rear of the seat back 14 to provide airbag protection for an occupant seated behind the vehicle seat assembly 12. Although the present disclosure is illustrated as being used with a passenger seat 12 in a first row of a vehicle 10, it should be understood that the side impact airbag module 88 and deployment device 90 may be used with any seat configuration, in any type of vehicle, and/or in any location within the vehicle where it is desirable to locate an airbag module 88 and to timely and accurately deploy the airbag member 92.

Figure 5:
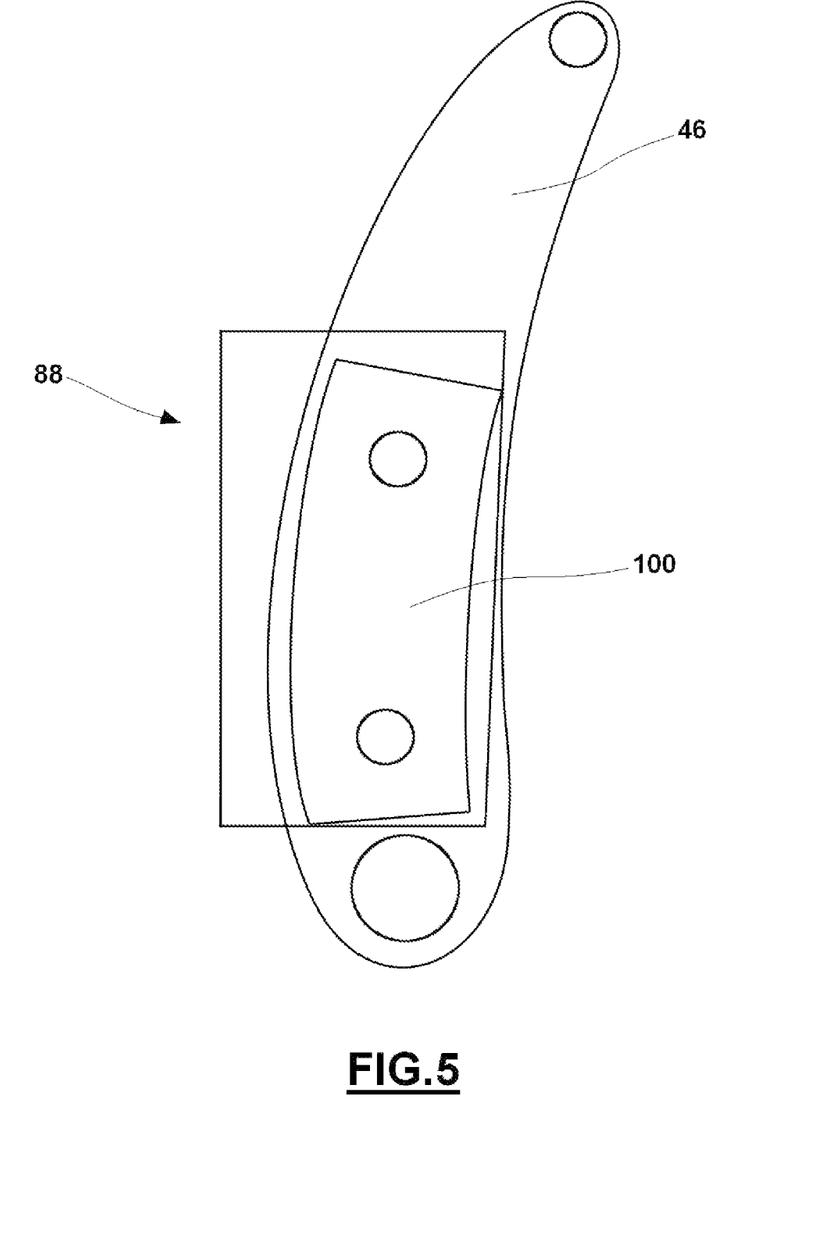
FIG. 5 is a side view of a portion of the vehicle seat assembly in FIG. 4 having an airbag coupled to the seat frame side member according to an exemplary embodiment.

Referring now to FIG. 5, a portion of the vehicle seat assembly IL having an airbag 34 coupled, to the scat frame side member 46 without the seat cover 32 or any padding is shown. The airbag module 88 is coupled to the seat back frame 36 (e.g., first and/or second side member 44, 46) and is configured to deploy through a burst seam 94 in the seat trim cover 32 of the seat back 14, as best shown in FIG. 3.

The airbag module 88 can include a gas generator 96 or any known or appropriate type which generates a gas for quickly expanding the air bag member 92 itself to deploy the air bag member 92 to a deployed position for protecting an occupant. The air bag module 88 also includes an air bag member 92 typically made of a force cloth or a woven, nylon material which is capable of properly functioning as an airbag member also known as a ballistic nylon).

The side impact airbag module 88 and deployment device 90 includes a force concentrating device 98 and can include other components not shown in the FIGURES. The airbag module 88 can further include an isolator 100 formed from a sheet of material and is generally flat, rectangular or annular body formed from a sheet of plastic or molded material. The isolator 100 generally includes a profile that matches the profile of the seat frame 34 in the areas proximate the airbag module 88 and the force cloth 112 and generally keeps the force cloth 112 separate from the seat flame 34 in an un-deployed position as well as during deployment. According to one exemplary embodiment, the force cloth 112 is provided between the airbag member 92 and the trim cover 32 of the seat back 14 The force cloth 112 can be a flexible non-stretchable material that directs and transmits the force of the deploying airbag member 92 to the burst seam 94 in the trim cover 32 of the seat back 14. The airbag member 92 therefore ruptures the trim cover 32 of the seat back 14 at a seam 94 instead of at some other point and provides for a more predictable and timely airbag deployment. As shown more clearly in FIGS. 5 and 6, the airbag (SIAB) module 88 may include an airbag, member 92 and a dual cavity liner system 106 for further controlling airbag deployment. The dual cavity liner system 106 further facilitates and optimizes deployment of the airbag member 92 by directing deployment in two locations.

Figure 6:
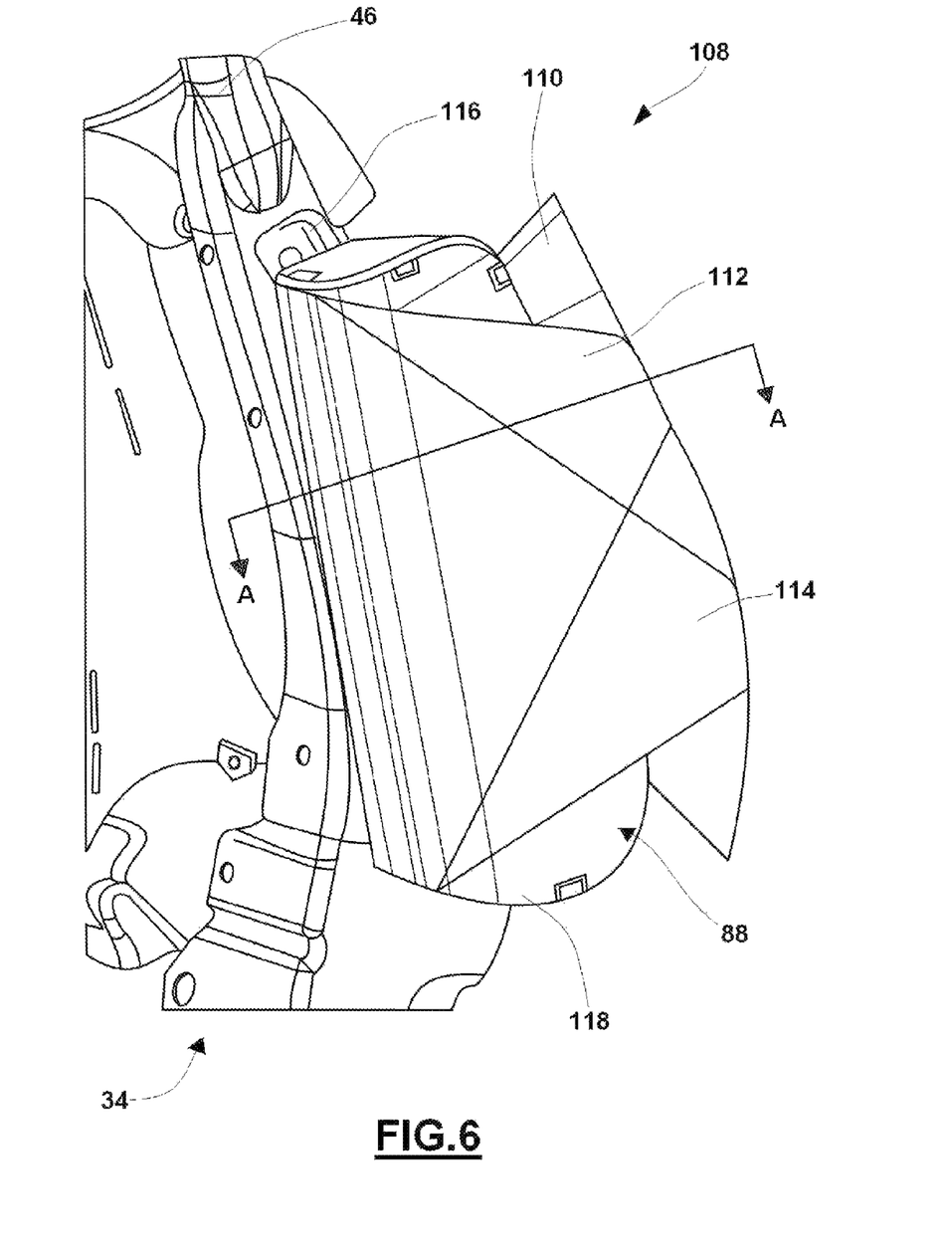
FIG. 6 is a perspective view of an airbag deployment control system coupled to a seat assembly according to an exemplary embodiment.

Referring now to FIGS. 5 and 6, an airbag deployment control system 18 coupled to a seat assembly 12 is shown. The airbag deployment control system 18 includes, among other components, aside impact inflatable airbag (SIAB) module 88, an inner cavity liner 110, an outer upper cavity liner 112, an outer lower cavity liner 114, and a burst seam 94. The SIAB module 88 is coupled to the seat assembly 12 (e.g., seat back, seat back side bolster, etc.) and includes a first (inboard) side (surface) 116 and a second (outboard) side (surface) 118. The outer upper cavity liner 112 and the outer lower cavity liner 114 are coupled at their first ends 120, 124 to the posterior inboard (adjacent the seat back side member 46) side of the SIAB module 116. The outer lower cavity liner 114 and the outer upper cavity liner 112 are both wrapped thereon around the SIAB module 88 partially enveloping the SIAB module 88. The outer lower cavity liner 114 and the outer upper cavity liner 112 are coupled at their second ends 122, 126 (i.e., tapered ends) to the inner cavity liner 110, as best shown in FIG. 5. The dual cavity liners 112, 114 control airbus 92 deployment at two locations by facilitating deployment of the airbag 92 in a desired direction. Each cavity liner (i.e., outer upper and lower cavity liners 112, 114) may be optimized to perform with the least amount of "stretch" in the deployment direction of the airbag 92. With each cavity liner 112, 114 optimized, the airbag 92 will reach the burst seam (tear seam) 94 faster which, in turn, translates into a faster deployment time of the airbag 92.

Figure 7:
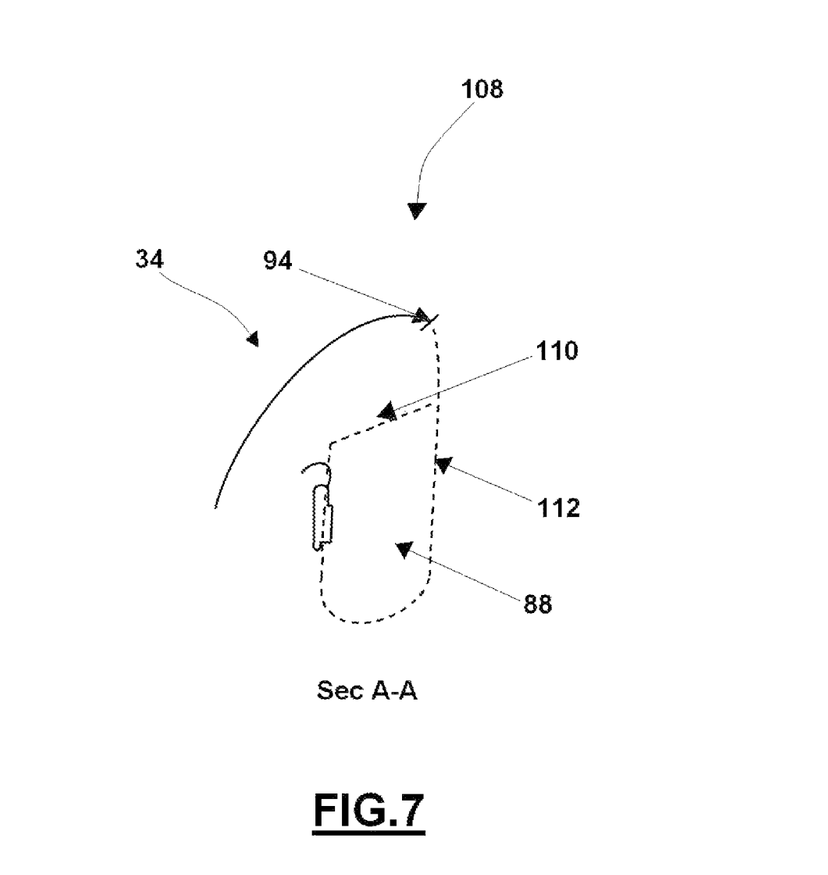
FIG. 7 is a cross-sectional view of the airbag deployment system of FIG. 6 along the A-A line according to an exemplary embodiment.
Figure 8:
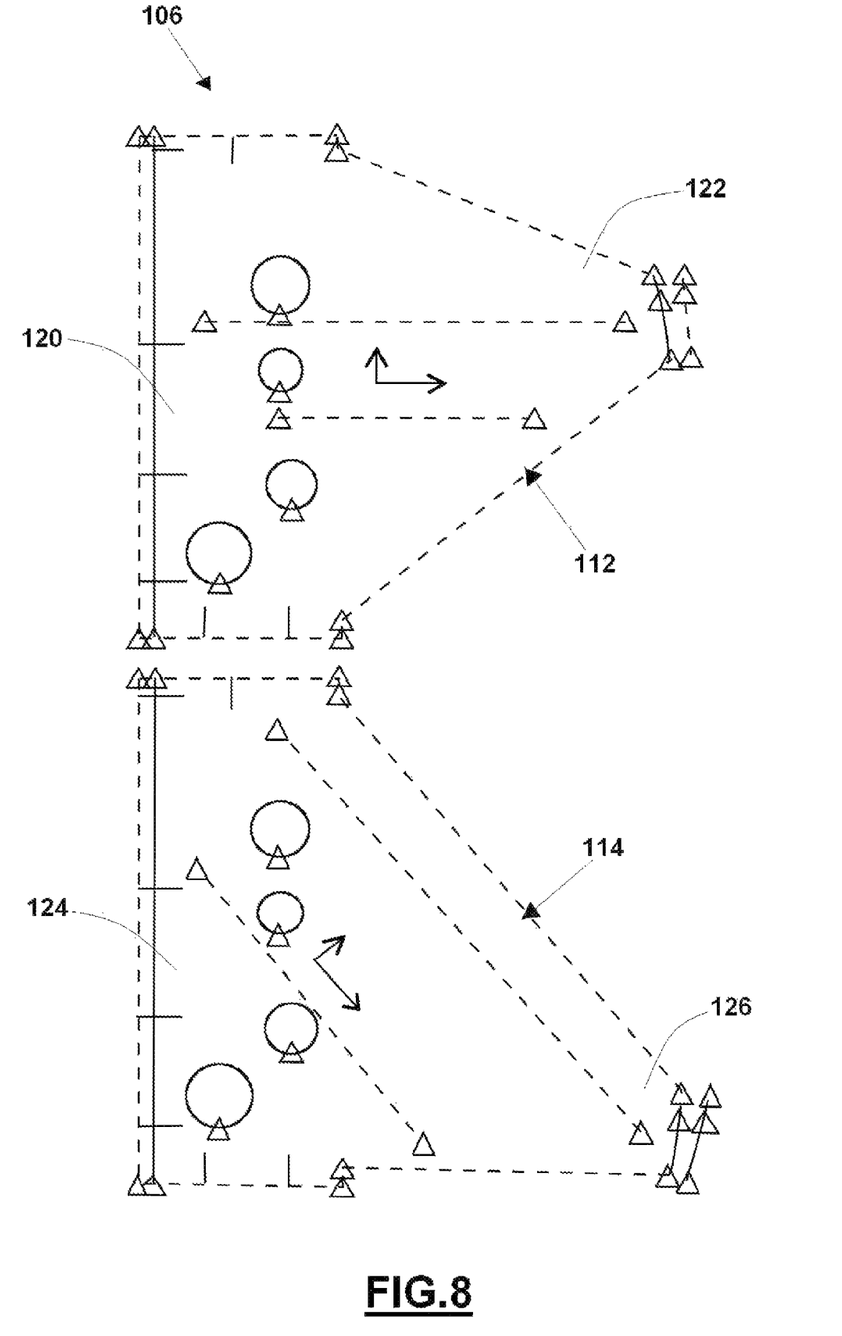
FIG. 8 is a side pattern view of an outer upper cavity liner pattern and an outer lower cavity liner according to an exemplary embodiment.
Figure 9:
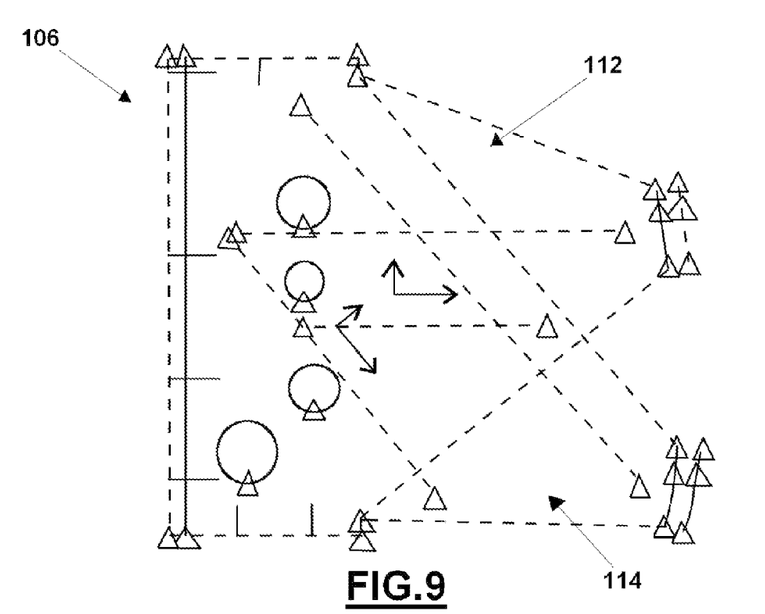
FIG. 9 is a side pattern view of the outer upper cavity liner and the outer lower cavity liner of FIG. 8 coupled together according to an exemplary embodiment.
Figure 10:
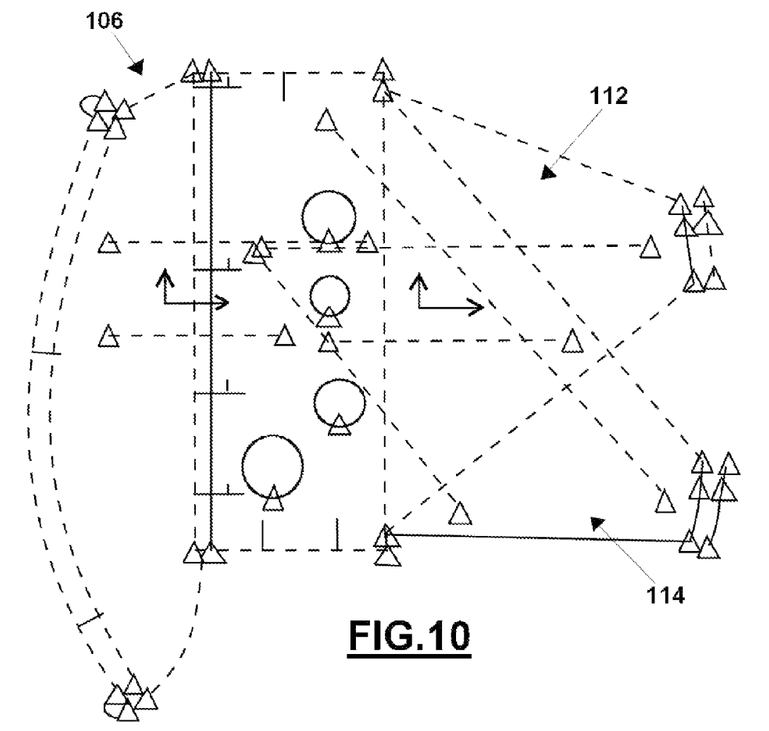
FIG. 10 is a partial side view of the outer upper cavity liner and the outer lower cavity liner of FIG. 9 coupled to the trim cover of the vehicle seat assembly according to an exemplary embodiment.

Referring now generally to FIGS. 7 through 9, the patterns of the outer upper cavity liner 112 and the outer lower cavity liners 114 are shown. According to one exemplary embodiment, the outer upper cavity liner and the outer lower cavity liners 112, 114 have a polygonal shape having a broad end 120, 124 which is coupled to the SIAB module 88 and a tapered end 122, 126 which is coupled to the inner cavity liner 110, but may be of any suitable geometric shape, dimension, size, etc.

For purposes of this disclosure, the term "coupled" means the joining of two components (mechanical and/or electrical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It is also important to note that the construction and arrangement of the elements of the vehicle seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A seat assembly comprising:
    a seat frame member having a side member;
    an airbag module having an airbag member and being coupled to the side member;
    a trim cover covering at least a portion of the seat assemble, including the airbag module, the trim cover having a burst seam for the airbag member to deploy through the trim cover by rupturing at the burst seam upon inflation of the airbag member;
    an upper outer liner member coupled to the airbag module, and a lower outer liner member coupled to the airbag module,
    wherein the upper outer liner member and the lower outer liner member each have a tapered end, the tapered ends being spaced apart to control deployment of the inflatable airbag member in at least two locations and direct the deployment of the inflatable airbag member towards the burst seam,
    wherein the upper outer liner member and the lower outer liner member are made of flexible non-stretchable material for directing and transmitting the force of the deploying airbag member to the burst seam faster and thereby enhancing the deployment time of the airbag member.

2. The airbag deployment control system of claim 1, wherein the upper outer liner member and the lower outer liner member are wrapped around and partially envelope the airbag module.

3. The airbag deployment control system of claim 1, wherein the second end of the upper outer liner member and the second end of the lower outer liner member are tapered for facilitating deployment of the airbag member towards the burst seam.

4. The airbag deployment control system of claim 1, further comprising an isolator for keeping the upper outer liner member and the lower outer liner member separate from the seat frame.

5. The airbag deployment control system of claim 1, further comprising a gas generator for expanding the airbag member.

6. The airbag deployment control system of claim 4, wherein the isolator has a profile that substantially matches the profile of the seat frame in the area proximate the airbag module.

* * * * *